(12) United States Patent
Akatsu

(10) Patent No.: US 9,063,690 B2
(45) Date of Patent: Jun. 23, 2015

(54) INFORMATION PROCESSING APPARATUS, INFORMATION PROCESSING SYSTEM, AND RECORDING MEDIUM STORING A PROGRAM INCLUDES A DEVICE CONTROL PROGRAM THAT IS UPDATED INDEPENDENTLY FROM A PROGRAM EXECUTED ON AN EXTERNAL APPARATUS

(71) Applicant: Takahiro Akatsu, Tokyo (JP)

(72) Inventor: Takahiro Akatsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/962,167

(22) Filed: Aug. 8, 2013

(65) Prior Publication Data

US 2014/0043636 A1 Feb. 13, 2014

(30) Foreign Application Priority Data

Aug. 13, 2012 (JP) ................................. 2012-179483

(51) Int. Cl.
*G06F 3/12* (2006.01)
*G06F 9/445* (2006.01)
*G06F 9/44* (2006.01)

(52) U.S. Cl.
CPC ............ *G06F 3/1297* (2013.01); *G06F 3/1203* (2013.01); *G06F 3/1225* (2013.01); *G06F 3/1228* (2013.01); *G06F 3/1289* (2013.01); *G06F 8/65* (2013.01); *G06F 9/4411* (2013.01)

(58) Field of Classification Search
USPC ........................................................ 358/1.15
See application file for complete search history.

(56) References Cited

U.S. PATENT DOCUMENTS

2008/0098094 A1* 4/2008 Finkelstein et al. .......... 709/220
2009/0025015 A1* 1/2009 Kurabayashi ................. 719/327

FOREIGN PATENT DOCUMENTS

JP 2009-025865 2/2009

* cited by examiner

*Primary Examiner* — Ngon Nguyen
(74) *Attorney, Agent, or Firm* — Harness, Dickey & Pierce P.L.C.

(57) ABSTRACT

An information processing apparatus that includes a device control program that is updated independently from a program executed on an external apparatus and includes a main unit, a first storage unit that stores additional function information that specifies an additional function added to the main unit inherited from the program in the external apparatus, a second storage unit that stores additional function information that specifies the additional function apart from the first storage unit, and a compatibility determining unit that identifies additional function information compatible with the main unit among one or more additional function information stored in the first storage unit and the second storage unit.

9 Claims, 15 Drawing Sheets

FIG. 5

```xml
<?xml version="1.0" encoding="utf-8" ?>
<printermodel="D" add_model="yes" ver="1.0">
<configuration>
        <feature id="OpTray" type="PickOne">
                <option opid="NotInstalled" />
                <option opid="1Cassette" />
                <option opid="2Cassette" />
        </feature>
        <feature id="PageSize" type="PickOne">
                <option opid="A4" />
                <option opid="A5" />
                <option opid="Legal" />
                <option opid="Letter" />
        </feature>
        <feature id="ISlot" type="PickOne">
                <option opid="*UseFormTrayTable" />
                <option opid="MultiTray" />
                <option opid="1Tray" />
                <option opid="2Tray" />
                <option opid="3Tray" />
        </feature>
        <feature id="Duplex" type="PickOne">
                <option opid="None" />
                <option opid="DuplexNoTumble" />
                <option opid="DuplexTumble" />
        </feature>
*snip*
</configuration>
<LayoutSettings>
*snip*
</LayoutSettings>
*snip*
</printer>
```

INFORMATION PROCESSING APPARATUS, INFORMATION PROCESSING SYSTEM, AND RECORDING MEDIUM STORING A PROGRAM INCLUDES A DEVICE CONTROL PROGRAM THAT IS UPDATED INDEPENDENTLY FROM A PROGRAM EXECUTED ON AN EXTERNAL APPARATUS

CROSS-REFERENCE TO RELATED APPLICATION

This patent application is based on and claims priority pursuant to 35 U.S.C. §119 to Japanese Patent Application No. 2012-179483, filed on Aug. 13, 2012 in the Japan Patent Office, the entire disclosure of which is hereby incorporated by reference herein.

BACKGROUND

1. Technical Field

The present invention relates to an information processing apparatus, an information processing system, and recording medium storing a program, 2. Background Art Recently, a printer driver known as a universal driver that includes multiple modes specific to models and changes operation in accordance with a connected model has been made available. The universal driver includes multiple model files specific to models in the driver package and implements operations specific to each model.

Also, a technology that facilitates getting and installing a new version of a driver in case a new model is released has been proposed (e.g., JP-2009-025865-A.) In the technology described in JP-2009-025865-A, a universal driver that supports a new model by adding a model file that defines the new model without updating core of the universal driver itself is presented.

In addition to the technology described in JP-2009-025865-A, a Point and Print technology provided by an Operation System (OS) is well known. The Point and Print technology facilitates connection to a remote printer in a client environment by providing all files and configuration information to the client from a print server.

If a printer driver is installed in the Point and Print environment described above, model information configured by the server is stored in a registry, and the model information is inherited in the client. In case a selected model is changed and the model information file is updated, the updated driver file is inherited by the client from the server, content of the registry is updated, and the latest information is inherited by the client each time.

However, in the universal driver that can utilize a new model by adding the model file described above, a problem can occur in case of applying the Point and Print technology. In the Point and Print environment of Windows Vista(trademark) or later, if a driver in a server is updated, it becomes possible to select either to update a driver configuration file in a client or to maintain the existing environment without updating. Consequently, because updating in the client can be done independently of the server, the version of a driver core can become different in each client environment.

If the update is not performed in the client, the latest driver configuration file is not inherited in the client. Meanwhile, the content of the registry is maintained as the latest status. Consequently, compatibility can be lost due to the difference in updating status between the driver configuration file and the registry information. Also, since the client configuration is sent to the server if the client is the administrator, compatibility can be lost by overwriting the server configuration with the client configuration due to the difference in updating status. If compatibility is lost, a mismatch can occur in displaying user interface (UI), possibly preventing normal printing.

SUMMARY

The present invention provides an information processing apparatus that includes a device control program that is updated independently from a program executed on an external apparatus. The information processing apparatus includes a main unit, a first storage unit that stores additional function information that specifies an additional function added to the main unit inherited from the program in the external apparatus, a second storage unit that stores the additional function information stored in the first storage unit apart from the first storage unit, and a compatibility determining unit that identifies additional function information compatible with the main unit among one or more additional function information stored in the second storage unit.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 5 is a diagram illustrating a data structure of additional model information stored in a registry and a local storage area as an embodiment of the present invention.

DETAILED DESCRIPTION

Figure 1:
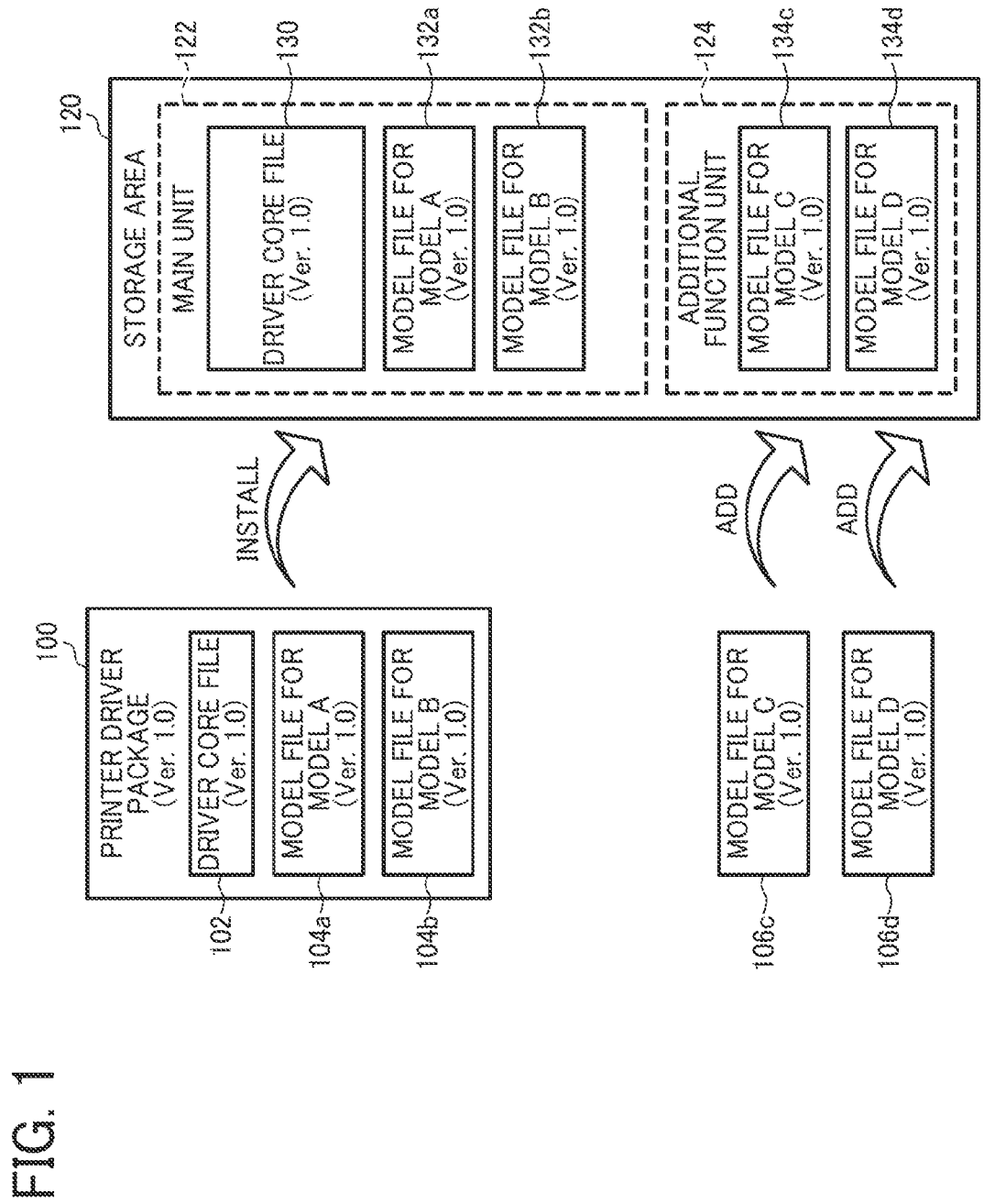
FIG. 1 is a schematic diagram illustrating a universal printer driver as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention are not limited to those described below. Moreover, in the following description, a universal printer driver package, a client that executes the universal printer driver, and a network print system that includes a server and a client that executes the universal printer driver are used as examples of an information processing apparatus and information processing system.

(Basic Operation of the Universal Printer Driver)

Basic operation of the universal printer driver (hereinafter referred to as printer driver) will be described below with reference to FIG. 1 and FIG. 2. FIG. 1 is a schematic diagram illustrating the printer driver. The printer driver is installed in a computer apparatus using a universal printer driver package 100 (hereinafter referred to as a package) provided in an executable format or system configuration file format.

The package 100 in FIG. 1 includes a driver core file 102 and more than one model file 104. The driver core file 102 is a program file that implements core functions such as displaying a user interface (UI) of the printer driver and generating drawing data. The model file 104 is provided separately from the driver core file 102 and definition data that described definition information to implement operations specific to the model. The model file 104 adds functions to the driver core file 102. The package 100 in FIG. 1 includes two model files 104a and 104b.

After installation using the package 100, various driver configuration files that comprise the printer driver are stored in a predefined storage area 120 prepared on an OS. In FIG. 1, driver configuration files such as a driver core file 130, a model file for model A 132a, and a model file for model B 132b are stored in the predefined storage area 120. In Windows environment as a specific embodiment, the storage area 120 described above is a folder such as "3" folder, "system 32" folder, or "ApplicationData" folder. The Windows environment is taken as an example in the description below.

The driver core file 130 of the printer driver is executed on the computer apparatus, outputs information of the model file 132a and 132b stored in the storage area 120 to the UI, and generates drawing data in accordance with settings configured on the UI. Consequently, modes specific to multiple models are implemented, and operation is changed in accordance with the model of the connected printer.

Furthermore, after the installation, the printer driver is configured to add a supported model using an external model file. Therefore, after the installation using the package 100, a new model file can be added and installed without updating the driver core. In FIG. 1, the model file for model C 134c and the model file for model D 134d are added to the storage area 120 using the external model files 106c and 106d.

Typically, the model file is added by storing the acquired model file in an appropriate storage position in the storage area 120 manually or by using a software component such as a management tool of the model files and an installer of the model files. Hereinafter, the additional model file is referred to as an additional model file.

Also, a part where the driver configuration file installed by the installation of the package 100 is stored is referred to as a main unit 122. Contrarily, a part where the additional model file 134 is stored is referred to as an additional function unit 124, as it includes a function added to the main unit 122 of the printer driver.

Furthermore, after being installed in a computer apparatus 140 that operates as the printer server (hereinafter referred to as server), the printer driver can be installed in one or more computer apparatuses that operate as the client (hereinafter referred to as client) using the Point and Print function provided by the OS.

Figure 2:
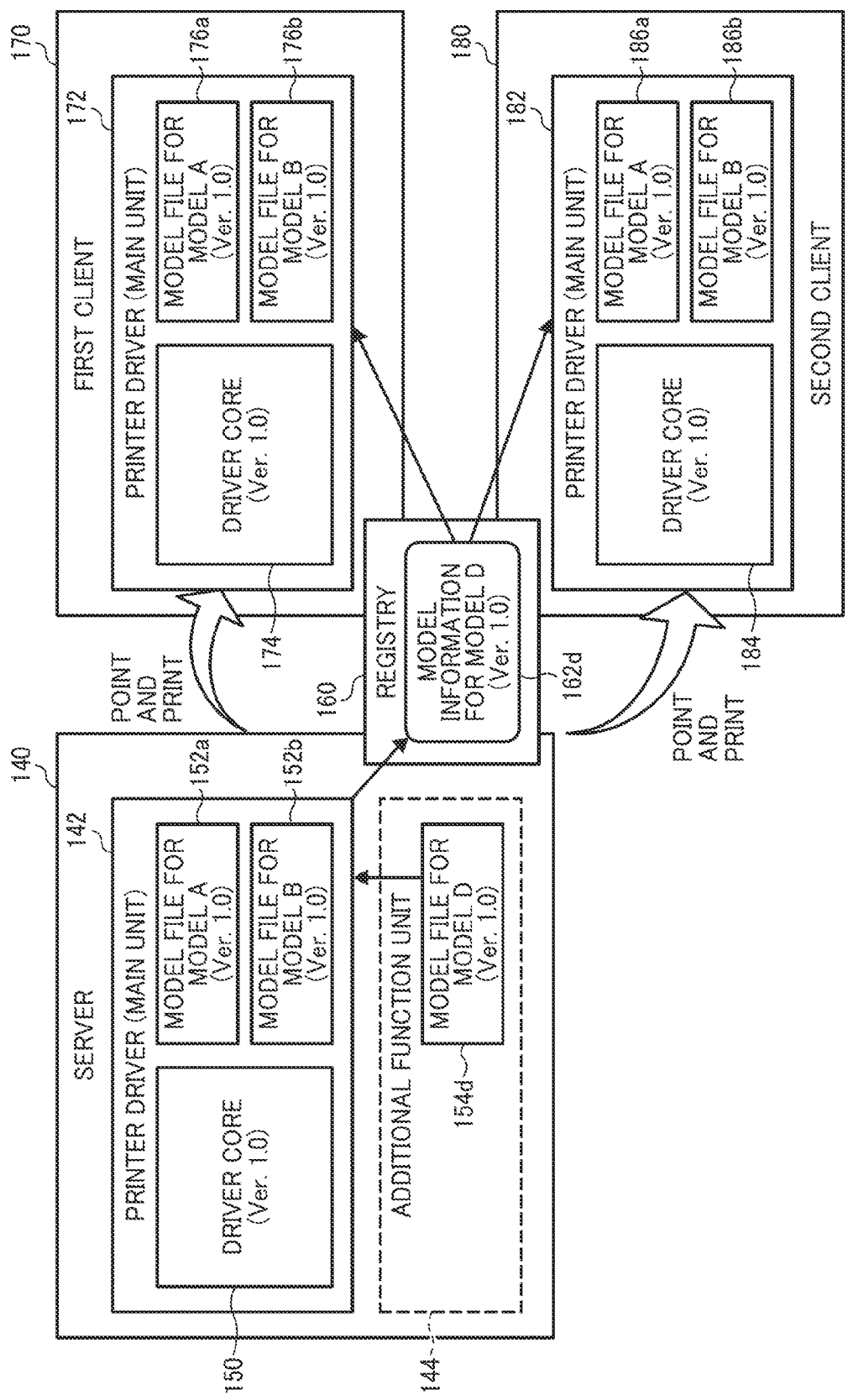
FIG. 2 is a diagram illustrating an installation of the universal printer driver in a client by using a Point and Print function as an embodiment of the present invention.

FIG. 2 is a diagram illustrating the installation of the printer driver in the client by using the Point and Print function. For example, in response to a command to establish connection to a printer connected to the server 140 on a first client 170, the driver configuration files (the driver core file, the model file for model A, and the model file for model B) is downloaded to the first client 170 from the server 140, and a main unit of the printer driver 172 is installed in the first client 170. The main unit of the printer driver 172 in the client is comprised of the driver core file 174, the model file for model A 176a, and the model file for model B 176b just the same as the main unit of the printer driver 142 in the sever 140. The case for other clients such as the second client 180 is the same as described above.

On the other hand, as for the additional model file 154 added and installed in the server 140, it can be inherited by the client via the registry 160 whose content is inherited by the client by the Point and Print function. On the server 140, in response to selecting a predefined additional model, the main unit of the printer driver 142 reads the corresponding additional model file 154 (e.g., the model file for model D 154d) and operates as the corresponding model. Concurrently, the main unit of the printer driver 142 stores content of the read additional model file 154 in the registry 160 and generates additional model information 162 (e.g., in this case, the model information for model D 162d).

The content of the registry 160 is also inherited by the client appropriately using the Point and Print function. In the first client 170, the main unit of the printer driver 172 can operate as the model selected in the server 140 by reading the additional model information 162 in the registry 160. The case for other clients such as the second client 180 is the same as described above.

Furthermore, the printer driver can be updated by using an updated universal printer driver package (hereinafter referred to as updated package) or an updating function of the printer driver.

Figure 3:
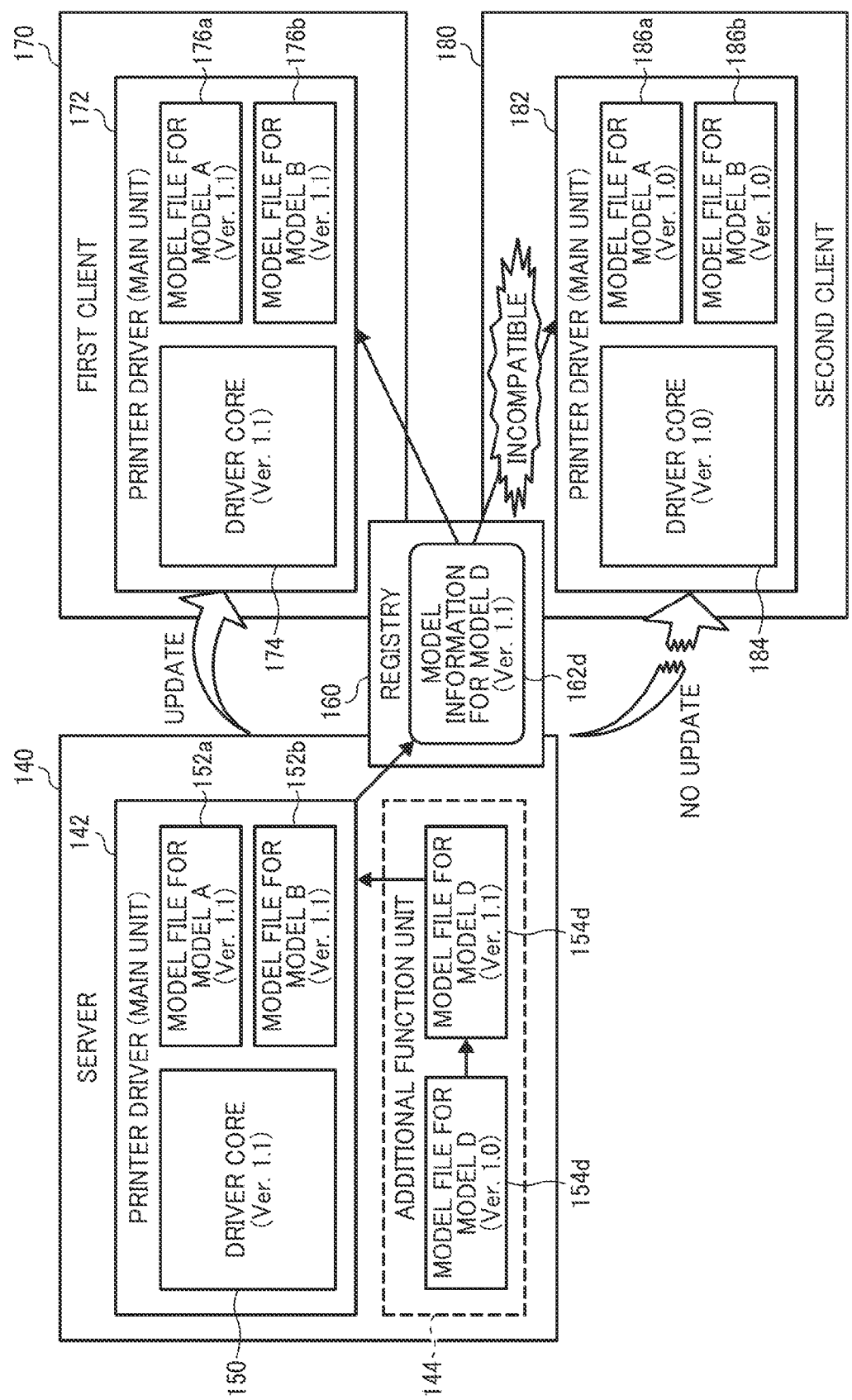
FIG. 3 is a diagram illustrating an issue in updating the universal printer driver as an embodiment of the present invention.

FIG. 3 is a diagram illustrating an issue in updating the universal printer driver. For example, in the state shown in FIG. 2, if update installation is performed using the updated package on the server 140, the driver configuration files in the main unit of the printer driver 142 are updated. In this case, as shown in FIG. 3, the driver core file 150 and the model files 152a and 152b are overwritten and updated with new ones. Also, if the updated package that supports a new model is used, the model file for the new model is newly created and saved in some cases.

On the other hand, an additional model file in the additional function unit 144 is replaced with one compatible with the main unit 142 in some cases. Alternatively, if difference information, etc., is defined preliminarily, the existing version of the additional model file is converted to the new version of the additional model file automatically in some cases.

Also, if the printer driver is updated on the server 140, the client can select either to update the driver configuration files or to maintain the existing environment without updating using a function provided by the OS as described above. That is, the client is configured to perform updating independently of the updating status in the server. In the case shown in FIG. 3, the first client 170 selects to update, and the second client 180 selects to maintain the existing environment without updating.

If updating is selected, the driver configuration files in the main unit of the printer driver 172 on the first client 170 are updated to new ones. In this case, as shown in FIG. 3, the existing files of the driver core file 174 and the model files 176a and 176b (version 1.0) are overwritten and updated with new ones (version 1.1). Alternatively, if updating is not selected, the existing driver configuration files in the main unit of the printer driver 182 on the second client 180 are maintained as is.

As for the additional model file in the additional function unit 144, regardless of whether or not it is selected to update in the client, the main unit of the printer driver 142 reads the new additional model file (version 1.1) and overwrites and saves it as the additional model information 162 in the registry 160 in response to the selection of a predefined additional model on the server 140. Subsequently, content of the registry 160 is inherited by the client using the Point and Print function.

In this case, if updating is selected, the compatibility issue does not occur since both the driver configuration files in the main unit of the printer driver 172 on the first client 170 and the content of the registry 160 are maintained with the latest status. However, if updating is not selected, while the main unit of the printer driver 182 is the existing driver configuration files (version 1.0) on the second client 180, the content of the registry 160 is maintained with the latest status. Consequently, compatibility can be lost due to the difference in updating status between the existing main unit of the printer driver 182 and the updated additional model information 162. If compatibility is lost, a mismatch can occur in displaying the UI, possibly preventing normal printing.

Therefore, the printer driver in this embodiment includes a configuration described in detail below in order to resolve the compatibility issue described above. A first embodiment and a second embodiment of the printer driver are described below.

First Embodiment

Operation of the printer driver (a device control program) in the network print system 200 in the first embodiment will be described below with reference to figures from FIG. 4 to FIG. 12.

Figure 4:
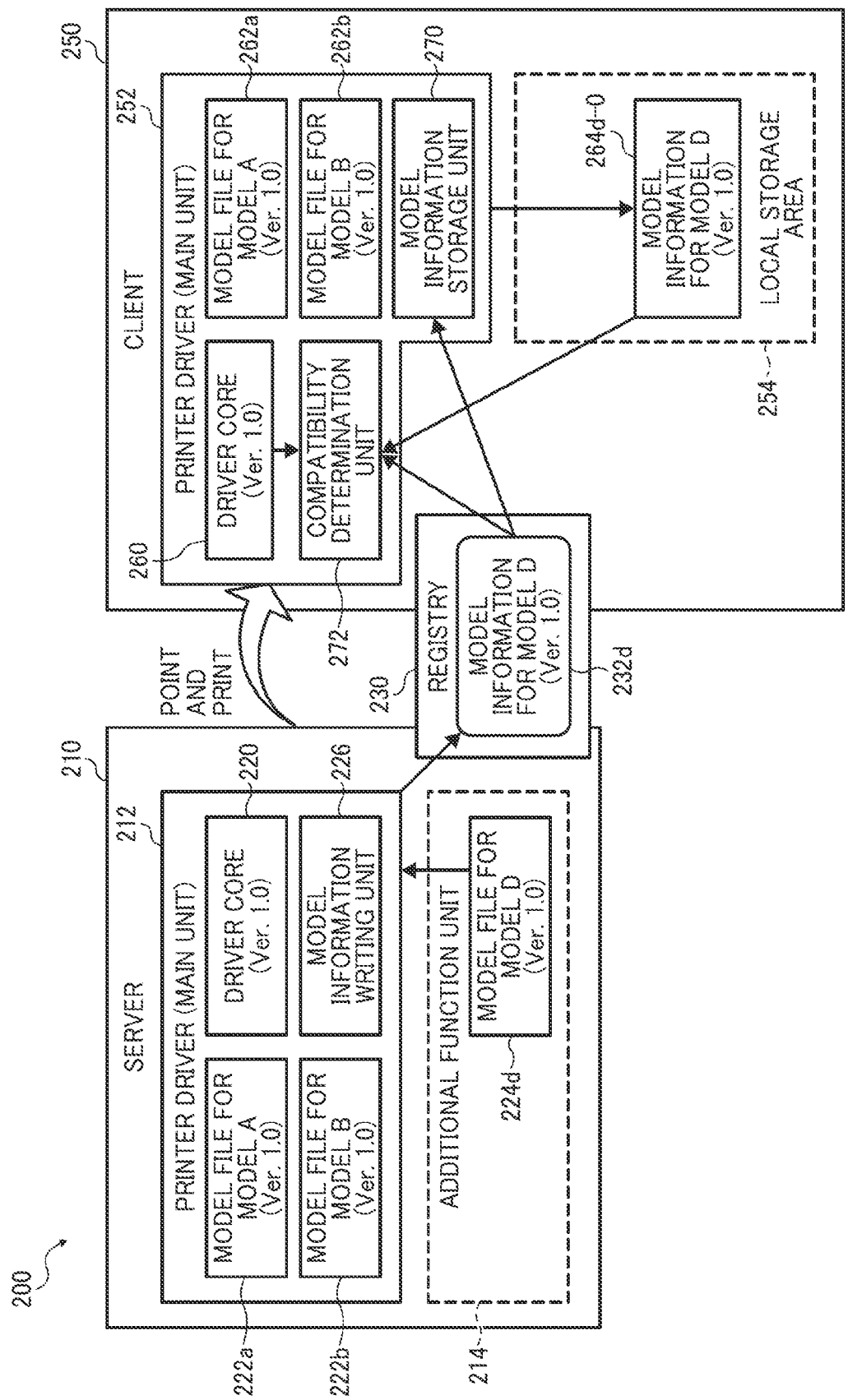
FIG. 4 is a diagram illustrating functions implemented on a server and a client in a network print system of a first embodiment of the present invention.

FIG. 4 is a diagram illustrating functions implemented on the server 210 and the client 250 in the network print system 200 of the first embodiment. In FIG. 4, a main unit of the printer driver 212 comprised of the driver core 220 and the model files 222a and 222b and the additional function unit 214 that includes the additional model file 224d are shown as main functional blocks on the server 210. Likewise, in FIG. 4, the main unit of the printer driver 252 associated with the main unit of the printer driver 212 that operates on the server 140 using the Point and Print function is shown as the main functional block on the client 250. The main unit of the printer 252 is comprised of the driver core 260 and model files 262a and 262b just the same as the server.

On the server 210 and the client 250, there is a registry 230 maintained of matching content between the server 210 and the client 250 using the Point and Print function. The printer driver on the server 210 includes a model information writing unit 226. If the additional model is selected in the printer driver of the server 210, the model information writing unit 226 reads the additional model file 224 corresponding to the selected additional model (the model file for model D 224d in the case shown in FIG. 4), writes the same content in the registry 230, and generates additional model information 232 (the model information for model D 232d in the case shown in FIG. 4). The latest model information of the additional model is written in the registry 230. The registry 230 comprises a first storage unit in this embodiment that stores the additional model information 232 that defines the additional model.

The main unit 252 on the client 250 shown in FIG. 4 further includes a model information storage unit 270 and a compatibility determining unit 272. The model information storage unit 270 stores the additional model information regarding the update in a predefined storage area if the additional model information in the registry 230 is updated after it is inherited from the printer driver in the server 210. When the printer driver is installed, when the UI is opened, and when printing is performed are examples of times when the model information storage unit 270 checks the registry 230. Aside from the registry 230, a storage area where the additional model information 264 is stored is referred to as a local storage area 254. The local storage area 254 corresponds to a second storage unit in this embodiment.

After detecting that the additional model information 232 in the registry 230 is updated, the model information storage unit 270 can store the updated additional model information in the local storage area 254. Alternatively, the model information storage unit 270 can store the un-updated additional model information before the update is performed actually. In addition, in a preferred embodiment, multiple pieces of additional model information in different versions can be stored additionally. While the storing can be performed in the way that stores all additional model information for each version, it is also possible that difference information between each version can be stored so that the additional model information of each version can be reproduced.

FIG. 5 is a diagram illustrating a data structure of the additional model information stored in the registry 230 and the local storage area 254 in this embodiment. The additional model information 232 and 264 is the same as the model file 104 and the additional model file 106 included in the package 100. As shown in FIG. 5, the additional model information 232 and 264 include information that indicates characteristics and specifications of models such as model name, characteristics list, and UI layout information, and preferably includes version of the model information and information that indicates whether or not the model is added.

The local storage area 254 is implemented as a storage area on a file system or registry, etc. In case of storing as a file, the local storage area 254 can be under "ApplicationData" folder for example. In case of storing as a registry, the local storage area 254 can be under HKEY_CURRENT_USER (HKCU), for example. Also, the additional model information for each additional model and each version can be held by using names that can identify the additional model information, the target model, and the target version as the file name and the registry name.

With continued reference to FIG. 4, the compatibility determining unit 272 determines the additional model information compatible with the main unit of the printer driver 252 in the client among one or more additional pieces of model information 232 and 264 stored in both the registry 230 and the local storage area 254 or either one of the registry 230 or the local storage area 254. Compatibility can be determined by comparing the version described in the drive core 260 and the version of the additional model information 232 and 264. It is determined that it is compatible if both versions match. Otherwise, if there is a compatibility association table that associates the version of the driver core and the version of model information compatible to the driver core preliminary, it is determined considering the association. In some cases, the same version of the additional model information can be stored in the registry 230 and the local storage area 254 due to the operation of the model information storage unit 270 described above. In that case, it is determined from either one of these pieces of information.

If it is determined that it is compatible, the main unit of the printer driver 252 reads the compatible additional model information. In the case shown in FIG. 4, since both the version of the driver core 260 (version 1.0) and the version of the model information 232d in the registry 230 and the model information 264d-0 in the local storage area 254 (version 1.0) match, either one of them is read.

Figure 6:
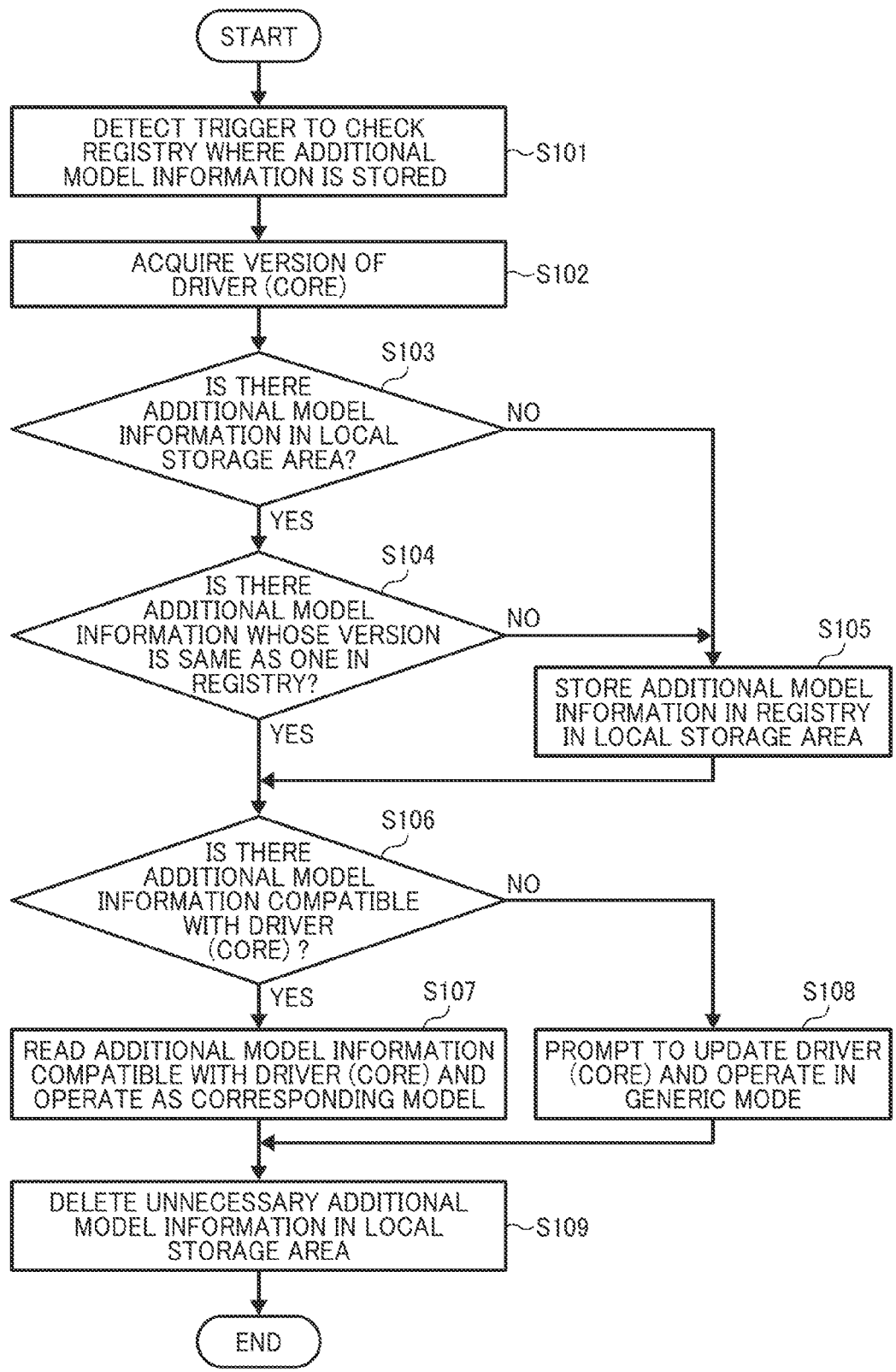
FIG. 6 is a flowchart illustrating a process executed by the client of the first embodiment of the present invention.

FIG. 6 is a flowchart illustrating a process executed by the client of the first embodiment. After starting the process, the client 250 detects an event that triggers a check of the registry 230 that stores the additional model information 232 in S101. Examples of the trigger are when a UI such as a dialog box of printer properties is opened and when the additional model is selected in case of updating the driver.

The client 250 acquires version of the main unit of the printer driver 252 (the driver core 260) in S102. The client 250 determines whether or not there is additional model information that corresponds to the selected additional model in the local storage area 254 by using the model information storage unit 270. It is possible to check that by defining a storage area and storage format to store the additional model information preliminary and searching in the storage area. Also, it is possible to store in an appropriate area in accordance with the environment if the storage area is selectable.

If it is determined that there is corresponding additional model information (YES in S103), the process proceeds to S104. In S104, the client 250 further determines whether or not there is additional model information 264 whose version (or time stamp) is the same as additional model information 232 in the registry. It is possible to perform this determination by either including version information in the model information or determining uniformity from acquirable time stamp. Also, in some cases, the local storage area 254 includes multiple model information. In that case, the client 250 checks all of model information. If it is determined that additional model information 264 whose version (or time stamp) is the same as additional model information 232 exists (YES in S104), the process proceeds directly to S106 without going through S105.

Contrarily, if it is determined that additional model information 264 whose version (or time stamp) is the same as additional model information 232 does not exist (NO in S104), the process proceeds to S105. Also, if it is determined that there is not corresponding additional model information (NO in S103), the process proceeds to S105. In S105, the client 250 reads the additional model information 232 in the registry 230 by the model information storage unit 270 and stores it in the local storage area 254 as the additional model information 264. Here, multiple versions of additional model information can be stored by forming a hierarchy with model or version and including model and version in file names and registry key names.

After storing the current version of additional model information of the server 210 in the local storage area 254 in the process from S103 to S105, the process proceeds to S106. In S106, the client 250 determines whether or not there is additional model information compatible with the main unit of the printer driver 252 of the client 250 in the registry 230 and the local storage area 254 by the compatibility determining unit 272. The compatibility is determined by comparing the version of the driver core 260 in the client 250 with the version of the additional model file.

If it is determined that the compatible additional model information exists (YES in S106), the process proceeds to S107. In S107, the client 250 reads the additional model information 232 or 264 that the compatibility determining unit 272 determined as the compatible additional model information by the main unit of the printer driver 252 and has the printer driver operate as the supported model. In S109, the client 250 deletes unnecessary additional model information in the local storage area 254, and the process ends. Here, model information whose version is older than the driver core 260 of the client 250 can be deleted since it will not be used hereafter.

Figure 7:
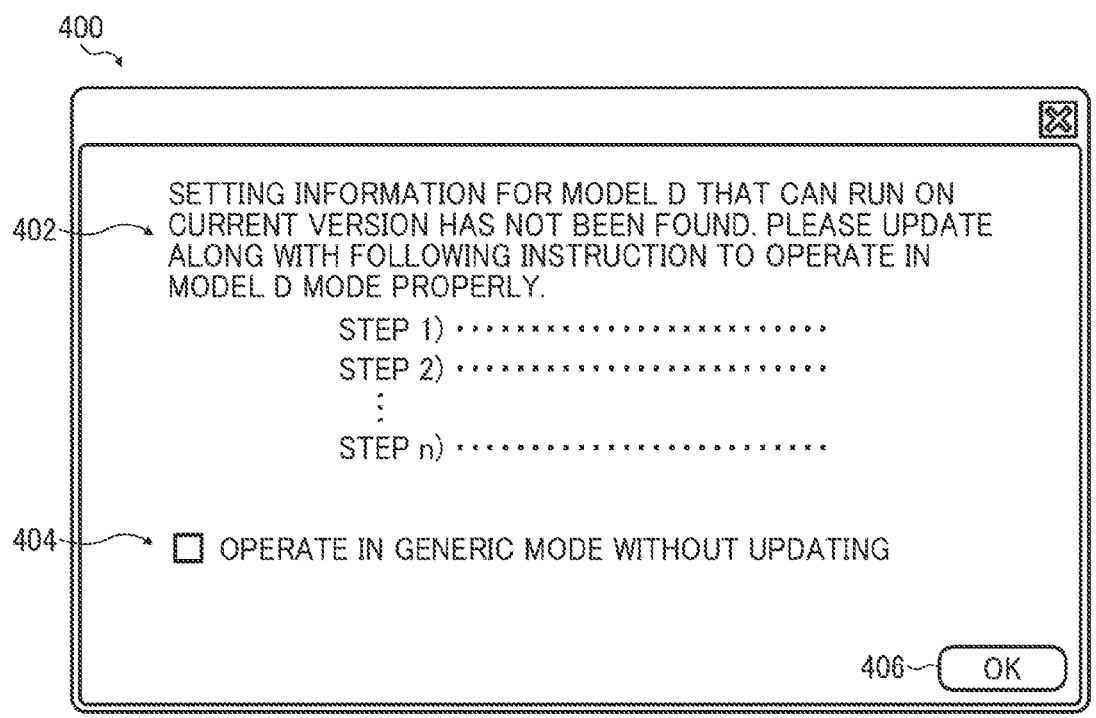
FIG. 7 is a diagram illustrating a prompt displayed in the first embodiment of the present invention.

Contrarily, if it is determined that the compatible additional model information does not exist (NO in S106), the process branches to S108. Considering the case that the compatible version of the additional model information does not exist due to deleting a file or not generating a file because of error by some chance, this branch is performed to have the driver not operate irregularly even in that case. In S108, a prompt shown in FIG. 7 is displayed on the display screen, and it prompts a user to adjust the version of the driver core to the version in the server. After changing to generic mode appropriately and having the driver operate, the process ends.

FIG. 7 is a diagram illustrating an example of a prompt that can be displayed in S108 shown in FIG. 6. The prompt 400 shown in FIG. 7 includes a message display 402 that prompts a user to update the driver core 260 of the client 250, a check box 404 that accepts a command to operate as generic mode, and an OK button 406 that finishes commanding. If there is no additional model information compatible with the version of the driver core 260 in the client 250, it is not possible to operate in the model mode. In that case, the prompt 400 in FIG. 7 is displayed to prompt the user to update the main unit of the driver 252 in the client 250 and allow operation in generic mode otherwise.

Figure 8:
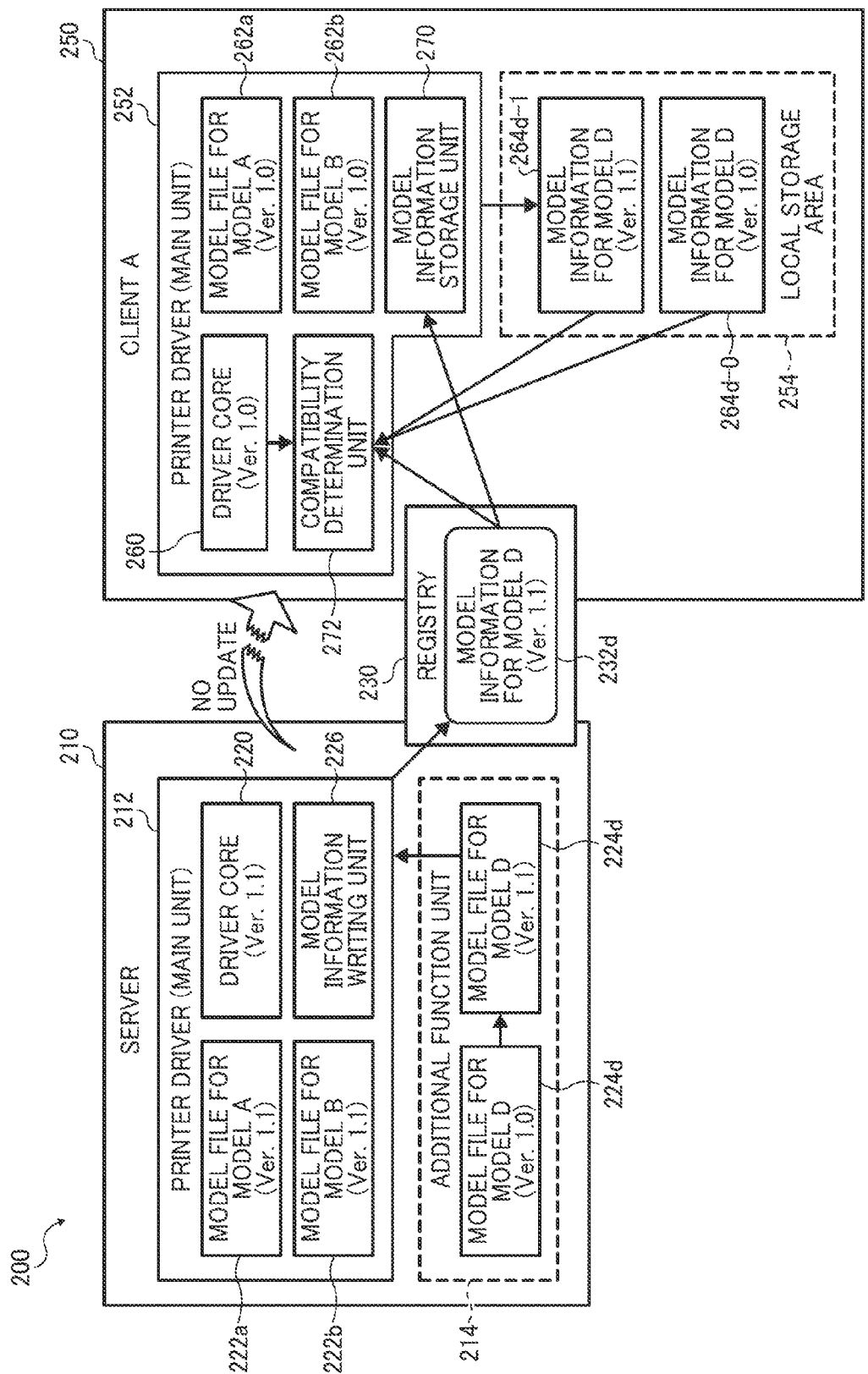
FIG. 8 is a diagram illustrating a state in which the update is performed on the server using an update package while it is not selected to update on the client in the first embodiment of the present invention.

FIG. 8 is a diagram illustrating a state in which the update is performed on the server 210 using the update package while updating is not selected on the client 250 in the first embodiment. For example, if the update install is performed using the update package (version 1.1) on the server 210 in the status shown in FIG. 4, the driver configuration file in the main unit of the printer driver 212 is updated as shown in FIG. 8. Also, the additional model file 224 in the additional function unit 214 is replaced with one compatible with the main unit 212. On the other hand, if the update is not performed in the client 250, the driver configuration file in the main unit of the printer driver 252 in the client 250 is maintained as is.

As for the additional model file 224 in the additional function unit 214, in response to the selection of additional model on the server 210, the model information writing unit 226 in the main unit of the printer driver 212 reads the new additional model file (version 1.1) and overwrites and stores it as the additional model information 232 in the registry 160. Subsequently, the content of the registry 230 is inherited by the client by the Point and Print function. After detecting that the additional model information in the registry 230 is updated, the model information storage unit 270 stores the additional model information regarding the update in the local storage area 254. In FIG. 8, new model information for model D 264d-1 (version 1.1) is added in addition to model information for model D 264d-0 (version 1.0) added previously.

In S106 and S107 shown in FIG. 6, the compatibility determining unit 272 identifies the additional model information compatible with the main unit of the printer driver 252 in the client 250 among additional model information 232d, 264d-0, and 264d-1 stored in the registry 230 and the local storage area 254. In FIG. 8, the additional model information 264d-0 whose version (version 1.0) is the same as the main unit 252 is identified as the compatible additional model information and read in S107.

By adopting the configuration described above, it is possible to perform updating independently from the update status of the server. Also, the client 250 whose version of the driver core is different from the server 210 maintains the additional model information suited to the version of the driver core 260 in the client 250 apart from the latest additional model information stored in the registry 230. Consequently, the compatibility problem due to the difference in update status of the main unit of the printer driver between the server 210 and the client 250 can be solved. Furthermore, displaying the UI and printing can be performed correctly.

Also, the registry 230 stores one additional model information 232 for each additional model. Therefore, since the amount of information stored in the registry is not increased even if the version increases, it is possible to operate well even in an environment where the size of the registry is disadvantageous, such as a narrow network.

An issue that can occur in case the update is performed using the update package on the server 210, update is not selected on the client 250, and the client has an administrative right will be described below.

Figure 9:
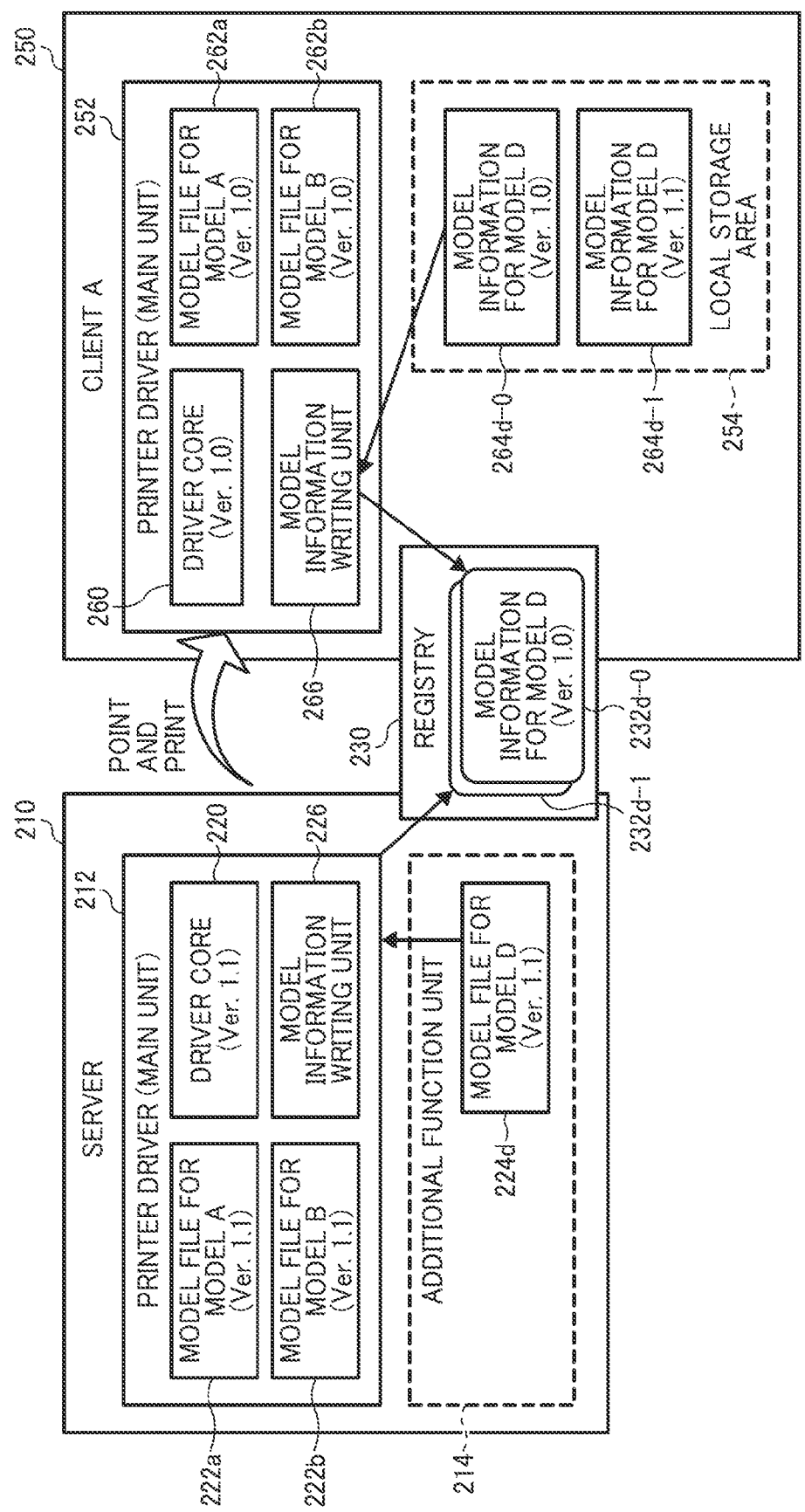
FIG. 9 is a diagram illustrating an issue in case the client has an administrative right as an embodiment of the present invention.

FIG. 9 is a diagram illustrating the issue in case the client has the administrative right. By the process described above, the additional model information compatible on the client 250 is stored in the client 250 in the environment where the version of the driver core can be different between the server 210 and the client 250. However, the issue can occur in case the client has the administrative right since the client 250 can store the additional model information whose version is different from the server 210.

Figure 10:
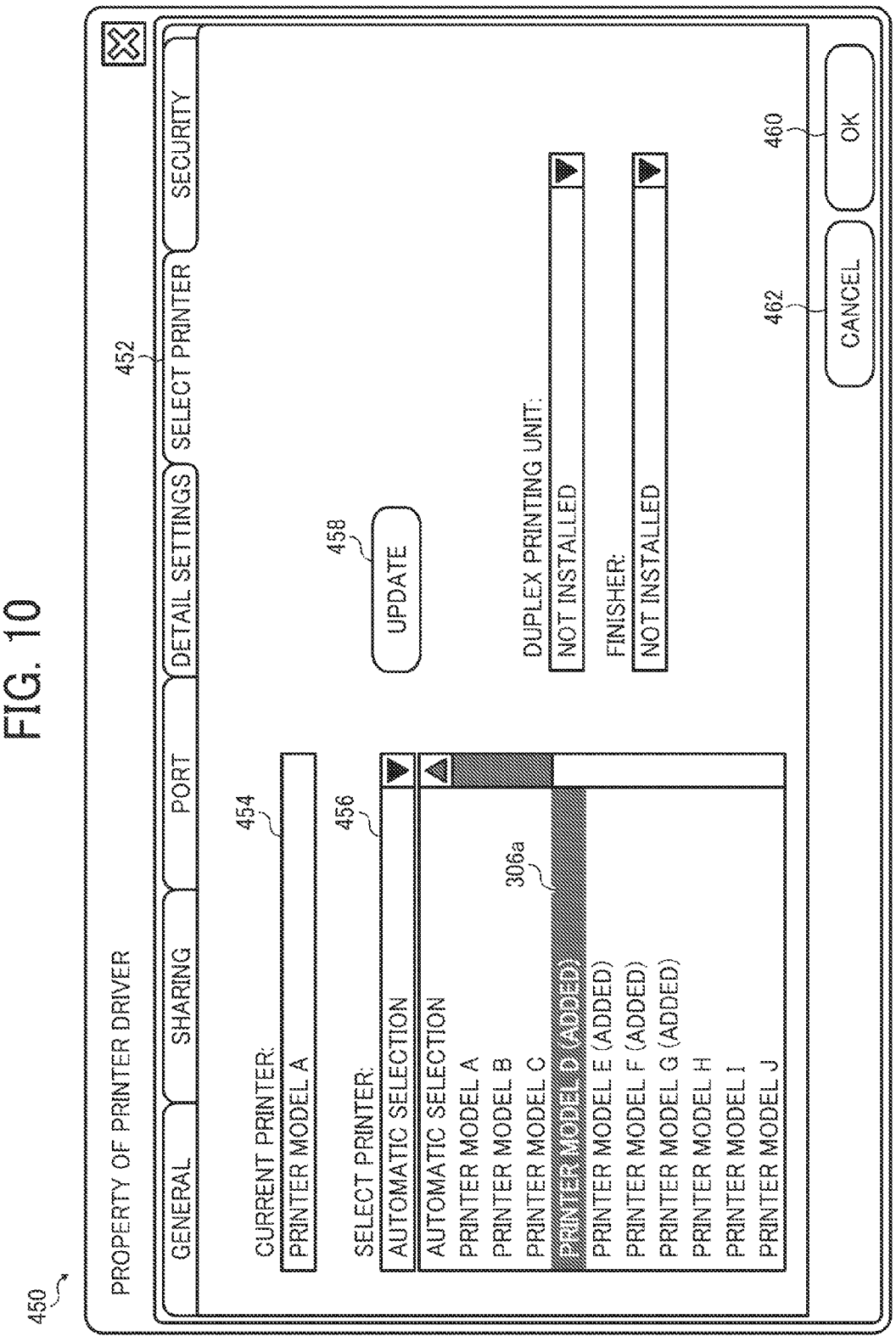
FIG. 10 is a diagram illustrating a screen to select models for the printer driver in the first embodiment of the present invention.

FIG. 10 is a diagram illustrating a screen to select models for the printer driver in the first embodiment. A property screen of the printer driver 450 includes multiple tabs, including a tab 452 is to display the screen to select models for the printer driver. The screen to select models for the printer driver 450 includes a current model indicator 454, a pull-down menu 456 that selects the model manually, an update button 458 to apply the settings, an OK button 460 to set the settings, and a cancel button 462 to cancel the settings.

As shown by a cursor 456a in FIG. 10, if an administrator selects a model on the property screen of the printer 450 and reflects the settings by pushing the update button 458 or the OK button 460 on the client, information of the selected model is stored in the registry 230. Therefore, the model information (the model information for model D 232d-1 in FIG. 9) written in the registry 230 by the model information writing unit 226 on the server 210 is overwritten with the additional model information (the model information for model D 232d-0 in FIG. 9) compatible with the driver core 260 by the model information writing unit 266 on the client 250. Subsequently, the compatibility issue can occur since the written information affects the server 210 and other clients.

To cope with the compatibility issue due to change of settings based on the administrative right on the client, the printer driver in the first embodiment includes a configuration described below.

The model information writing unit 266 in the client 250 of the first embodiment corresponds to a detector that detects a trigger to update the additional model information in the registry 230 by an operation on the client and a writing unit that writes the compatible additional function information in the registry 230 in case the additional function information compatible with the main unit 212 on the server exists in response to the trigger described above.

Figure 11:
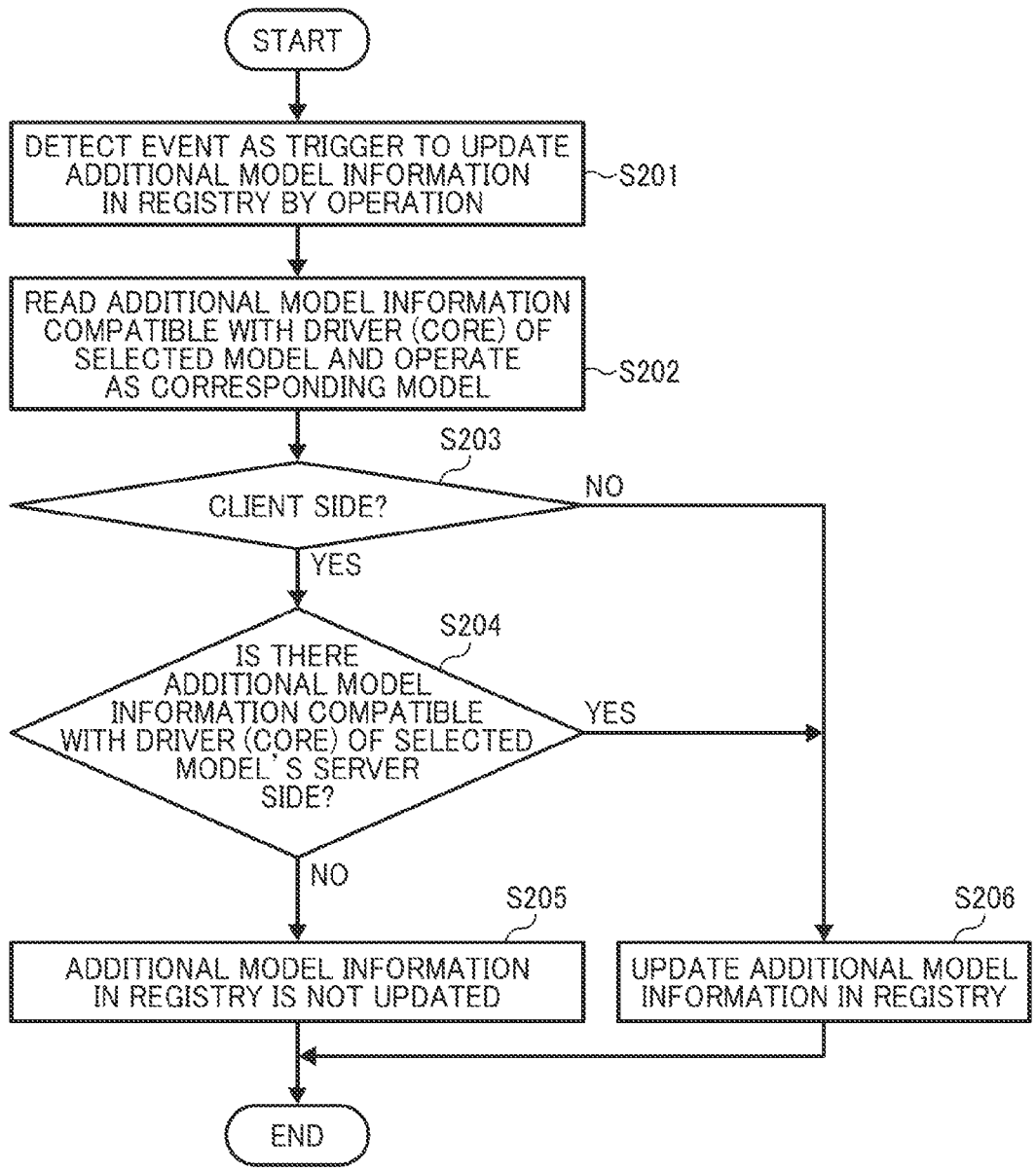
FIG. 11 is a flowchart illustrating a process to write model information executed on a computer apparatus in the first embodiment of the present invention.

FIG. 11 is a flowchart illustrating a process to write the model information executed on the computer apparatus in the first embodiment. The model information writing units 226 and 266 in the server 210 and the client 250 execute the process shown in FIG. 11. After starting the process shown in FIG. 11, the computer apparatus (the server or the client) detects a trigger to update the additional model information in the registry 230 by operation in S201. For example, if the administrator selects a model on the list box 456 in the printer property screen 450 shown in FIG. 10 and reflects the settings by the update button 458 or the OK button 460, the event is detected.

In S202, the computer apparatus reads the additional model information that supports the selected additional model and is compatible with the driver core by using the main unit of the printer driver 252 and has it operate as the supported model. In S203, the process branches depending on whether the subject that executes the process is the server or the client.

If it is determined that the server is the executing subject of the process (NO in S203), the process proceeds to S206. In this case, it is OK to update with the latest model information on the server. Therefore, the computer apparatus updates the additional model information in the registry 230 by the model information writing unit 226 in S206, and the process ends.

Alternatively, if it is determined that the client is the executing subject of the process (YES in S203), the process branches to S204. In S204, the computer apparatus determines whether or not the additional model information that supports the selected model and is compatible with the driver core 220 in the server 210 exists. If it is determined that there is no additional model information compatible with the server 210 (NO in S204), the process branches to S205. In S205, the computer apparatus does not update the additional model information in the registry 230, and the process ends.

Contrarily, if it is determined that there is additional model information compatible with the server 210 (YES in S204), the process branches to S206. In S206, the computer apparatus updates the registry 230 with the additional model information compatible with the server 210, and the process ends.

By adopting the configuration described above, the additional model information suited to the version of the driver core 220 in the server 210 is stored in the registry 230 regardless of the update status of the main unit of the printer driver 252 in the client 250. Consequently, the appropriate additional model information is inherited by the server 210 or other clients even if the selection of the model is performed on the client. Therefore, the compatibility issue due to the difference in the update status of the main unit of the printer driver between the server 210 and the client 250 does not occur even if the client 250 owns the administrative right.

Since the additional model information 264 is stored in the local storage area 254 additionally, a configuration that deletes unnecessary additional model information will be described below.

Figure 12:
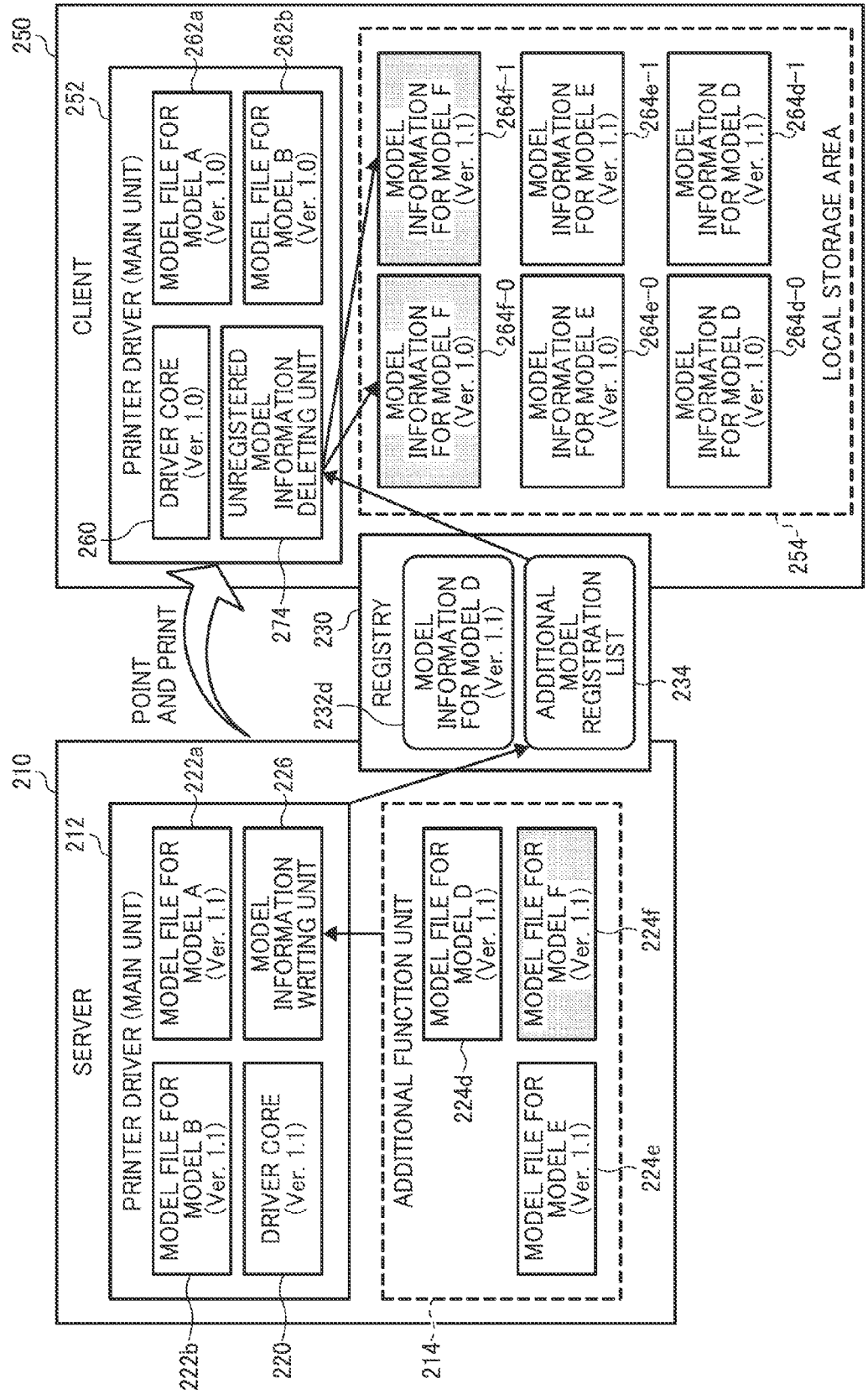
FIG. 12 is a diagram illustrating functions to delete unnecessary additional model information in the network print system of the first embodiment of the present invention.

FIG. 12 is a diagram illustrating functions implemented on the server and the client to delete unnecessary additional model information in the network print system of the first embodiment. The model information writing unit 226 on the server 210 in this embodiment writes an additional model registration list 234 that registers one or more additional model added to the main unit of the printer driver 212 on the server 210 in the registry 230. The additional model registration list 234 registers one or more additional models and is configured as list that enumerates model names to understand which model is added.

Also, the main unit of the printer driver 252 on the client 250 in this embodiment can further include an unregistered model information deleting unit 274 that deletes all additional model information of additional models unregistered to the additional model registration list 234 from the local storage area 254.

For example, in the status shown in FIG. 12, if the server 210 deletes an additional model F (highlighted in FIG. 12), the model F is deleted form the additional model registration list, and that information is inherited by the client 250. The client 250 refers to the additional model registration 234 by using the unregistered model information deleting unit 274, detects that the model F whose additional model information exists in the local storage area 254 has been deleted, and deletes all additional model information 264f-0 (highlighted in FIG. 12) of model F stored in the local storage area 254.

By adopting the configuration described above, it is possible to prevent unnecessary additional model information from being stored in the local storage area 254.

Second Embodiment

In the first embodiment described above, the client stores the additional model information for each version in the local storage area 254 in order to acquire the additional model information suited to the version in the client. Now, a second embodiment that stores the additional model information for each version in the registry by the server will be described below with reference to FIG. 13 and FIG. 14.

Figure 13:
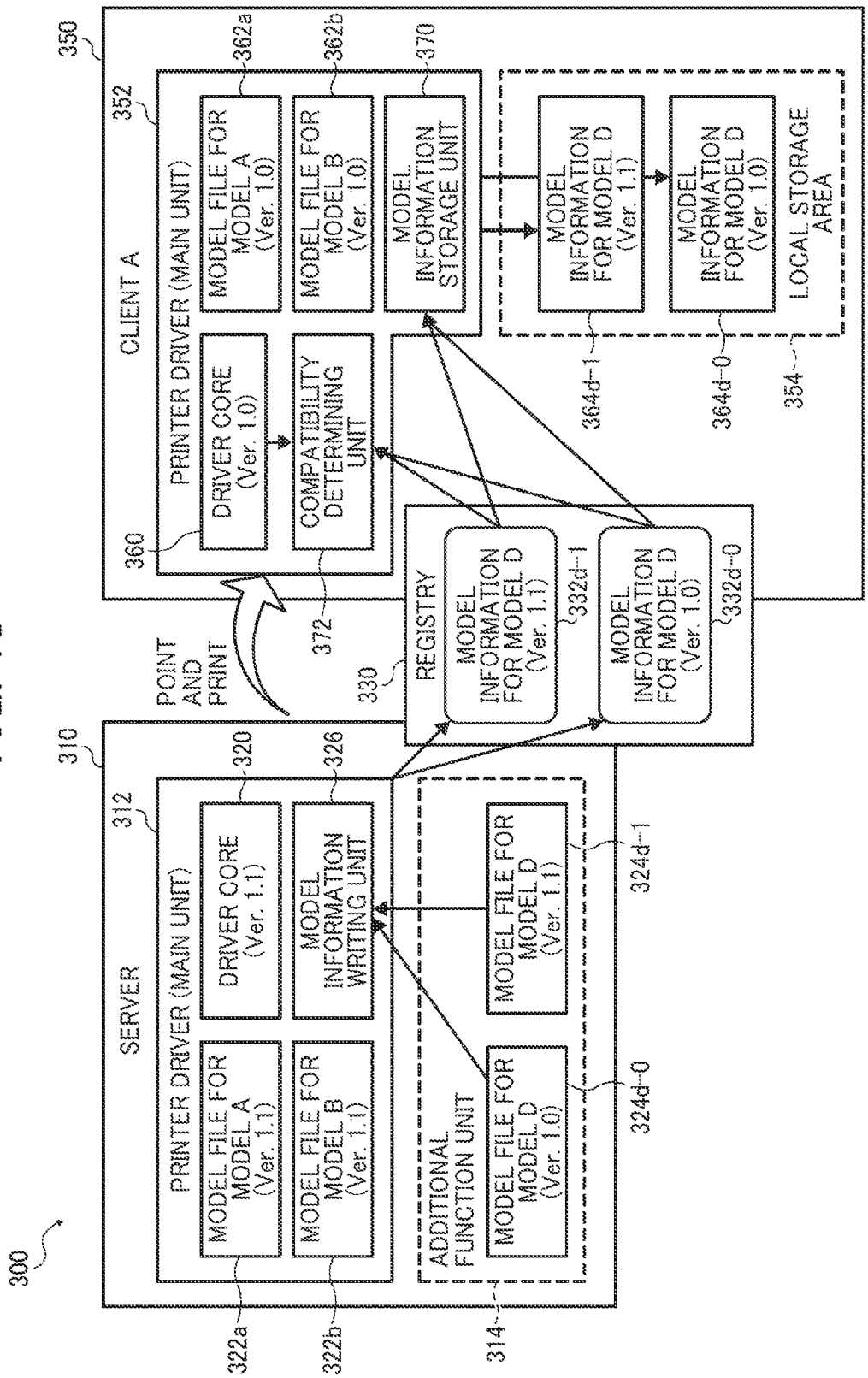
FIG. 13 is a diagram illustrating functions implemented on the server and the client in the network print system of a second embodiment of the present invention.

FIG. 13 is a diagram illustrating functions implemented on a server 310 and a client 350 in the network print system 300 of the second embodiment. The same configuration as shown in FIG. 4 is shown in FIG. 13. That is, a main unit of a printer driver 312 and a additional function unit 314 are shown in FIG. 13 as main functional units in the server 310, and a main unit of a printer driver 352 is shown in FIG. 13 as a main functional unit in the client 350. There is a registry 330 on the server 310 and the client 350 just the same as the first embodiment.

In response to the selection of the additional model on the server, a model information writing unit 326 in the server 310 in the second embodiment reads all versions of additional model file 324 suited to the selected additional model (model files for model D 324d-0 and 324d-1 in FIG. 13), writes them in the registry 330, and generates additional model information 332 for all versions (model information for model D 332d-0 and 332d-1 in FIG. 13). In the second embodiment, all model information suited to the additional model in the server is written in the registry 330. In the second embodiment, an area where the latest additional model information is stored in the registry 330 corresponds to a first storage unit, and an area where the older version of the additional model information is stored corresponds to a second storage unit.

A compatibility determining unit 372 in the client 350 identifies the additional model information compatible with the main unit 352 in the client among all versions of the additional model information stored in the registry 330. The determination of the compatibility is performed in the same way as in the first embodiment. If it is determined that it is compatible, the main unit of the printer driver 352 reads the compatible additional model information, and the printer driver operates as the supported model. In FIG. 13, since the version of the driver core 360 (version 1.0) matches the version of the additional model information 332d-0 in the registry 330 (version 1.0), the additional model information 332d-0 is read.

In the second embodiment, if the additional model information does not exist in the local environment of the client 350, it is possible to prohibit selection of the model even in case a user on the client 350 has the administrative right. Otherwise, as shown in FIG. 13, the model information storage unit 370 is configured to store all versions of the additional model information 332 stored in the registry 330 in the local storage area 354, and the client 350 can select the additional model information in case the administrator uses the client at least.

Figure 14:
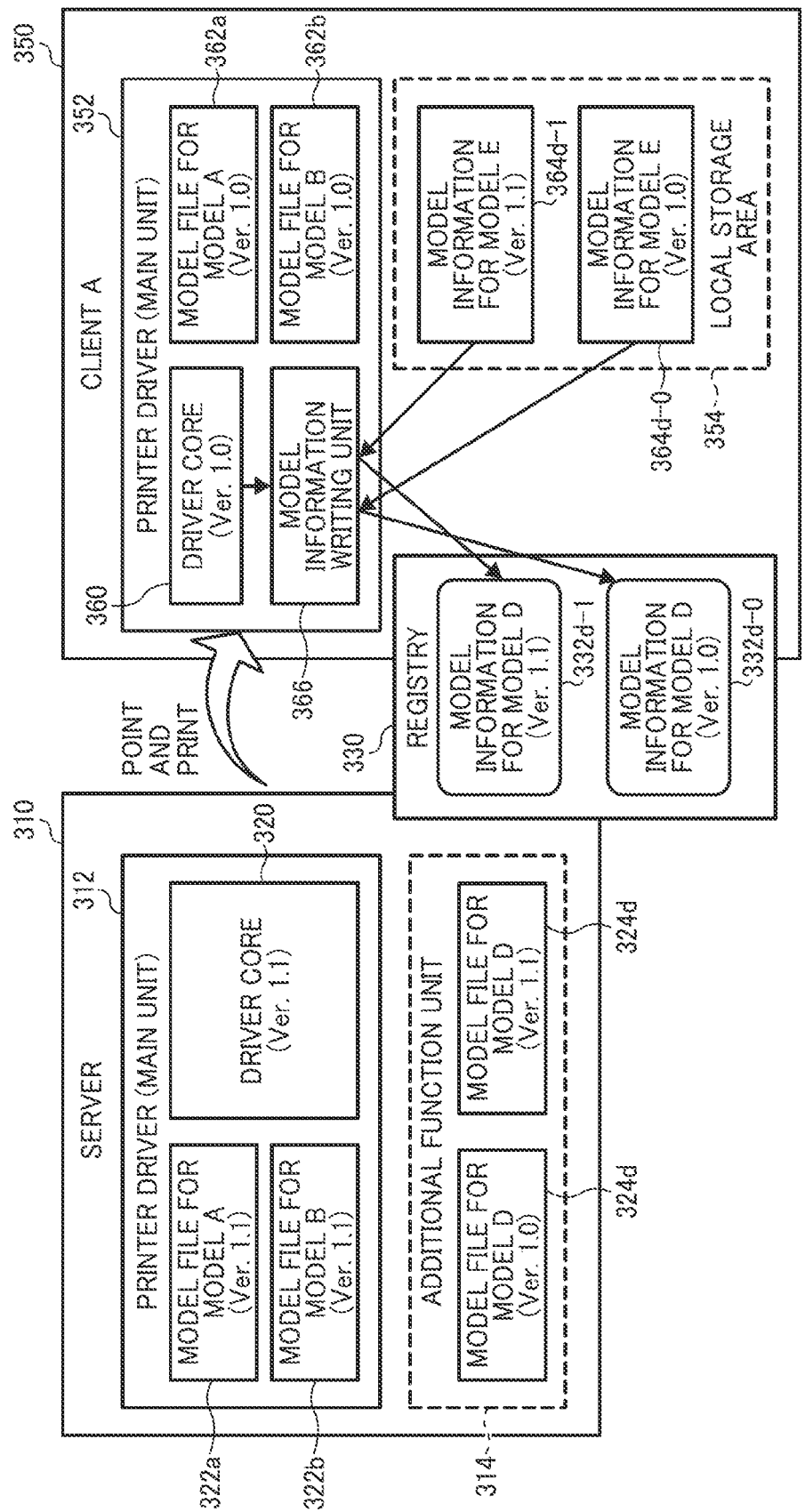
FIG. 14 is a diagram illustrating an operation in case of not selecting to update on the client and selecting an additional model on the client by administrative right in the second embodiment of the present invention.

FIG. 14 is a diagram illustrating an operation in case of not selecting to update on the client and selecting the additional model on the client by administrative right in the second embodiment. In the embodiment where it is possible to select the additional model information on the client 350, if the administrator selects the additional model and reflects the settings on the client, all versions of the additional model information for the selected model is stored in the registry 330. Therefore, on the server 310, it is possible to read the model information suited to the version of the main unit 320 in the server among all versions of the additional model information (the model information for model D 364d-0 and 364d-1 in FIG. 14) written by the model information writing unit 366 in the client 350.

The second embodiment has an advantage over the first embodiment in that, in the second embodiment, it is unnecessary to manage files of the additional model information for each version generated locally since it is unnecessary to keep a file in the client 350 locally. Preferably, it is possible to choose either the first embodiment or the second embodiment depending on the environment.

The present invention provides the information processing apparatus and information processing system that resolves the compatibility problem with the device control driver that enables utilizing a new function by adding function information and is updated independently of an updating status in an external apparatus. By the present invention, it is possible for the information processing apparatus and information processing system to resolve the compatibility problem with the device control driver that enables utilizing a new function by adding function information and is updated independently of an updating status in an external apparatus.

Hardware Configuration

Figure 15:
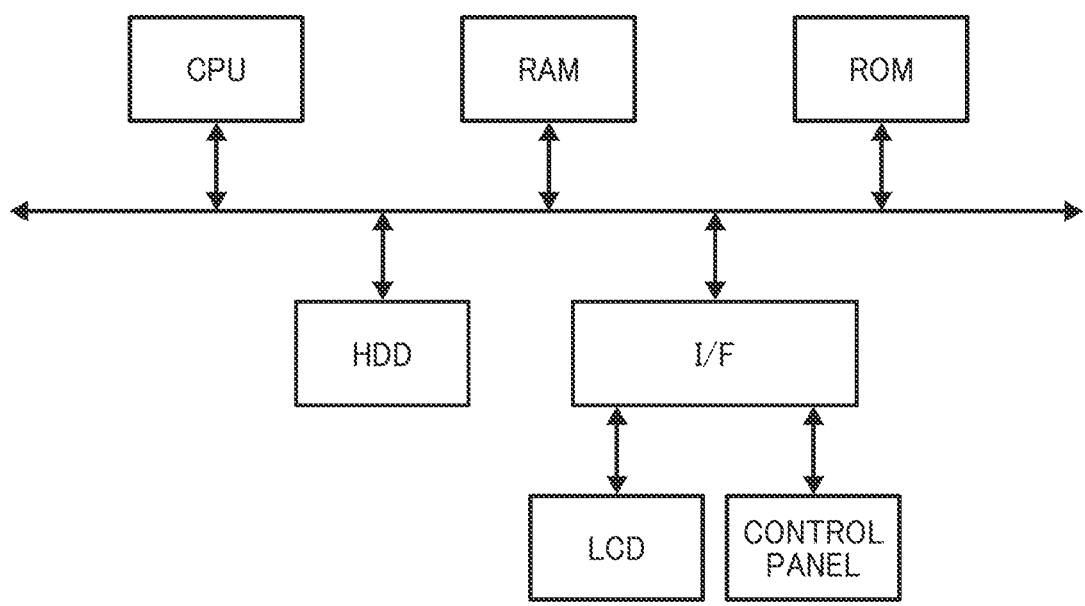
FIG. 15 is a diagram illustrating a hardware configuration of a computer apparatus as an embodiment of the present invention.

FIG. 15 is a diagram illustrating a hardware configuration of the computer apparatus in the embodiments. In the embodiments, the computer apparatus has the same configuration as generic information processing terminals. That is, in the computer apparatus of the embodiments, a Central Processing Unit (CPU), a Random Access Memory (RAM), a Read Only Memory (ROM), a Hard Disk Drive (HDD), and an interface (I/F) are connected with each other via a bus. Also, a Liquid Crystal Display (LCD) and a control device is connected to the I/F. The CPU is a processing unit and controls operation of the whole computer apparatus. The RAM is a high-speed volatile storage device that can read and write data and used as a work area when the CPU processes data. The ROM is a read-only nonvolatile storage device and stores programs such as firmware. The HDD is a nonvolatile storage device that can read and write data and stores an Operating System (OS), various control programs, and application programs, etc. The FF connects the bus with various hardware and the network, etc., and controls them. The LCD is a visual user interface that a user can use to check the status of the computer apparatus. The control device is a user interface such as a keyboard and a mouse that a user can use to input information into the computer apparatus.

As described above, it is possible to use the new function by adding the function information in the embodiments. Therefore, regarding the device control driver updated independently from the update status of the external apparatus, it is possible to provide the information processing apparatus and information processing system that can solve the compatibility issue.

The functional units described above can be implemented by a program executable on a computer and written in legacy programming languages and object oriented program languages such as assembler, C, C++, C#, and Java, and the program can be distributed storing in readable storage medium such as a ROM, a EEPROM, a EPROM, a flash memory, a flexible disk, a CD-ROM, a CD-RW, a DVD-ROM, a DVD-RAM, a DVD-RW, a blu-ray disk, a SD card, and a MO or via an electronic communications network.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An information processing apparatus including a printer driver to be executed by a computer, the information processing apparatus comprising:
    a device control program including a main unit to be executed on an external apparatus, which is installed from an external control program including a main unit, wherein the main unit in the device control program is updated independently from the main unit in the external control program;
    a first storage unit to receive additional function information for adding a function to the external control program whose version corresponds to the version of the main unit in the external control program and store the additional function information in a first storage area;
    a second storage unit, different from the first storage unit, to store the additional function information in a second storage area if the second storage unit does not store the same version of the additional function information stored in the first storage unit; and a determining unit to identify additional model information whose version corresponds to the main unit in the device control program among the additional model information stored in the first storage area and the second storage area.

2. The information processing apparatus according to claim 1, further comprising a storage controller to store additional function information to be updated in the second storage unit in case additional function information stored in the first storage unit inherited from the program in the external apparatus is updated.

3. The information processing apparatus according to claim 1, wherein the first storage unit stores additional function information compatible with the main unit of the program in the external apparatus after being inherited from the program in the external apparatus, and the second storage unit stores different version of additional function information different from the additional function information compatible with the main unit of the program in the external apparatus.

4. The information processing apparatus according to claim 1, further comprising:
    a detector to detect a trigger to update the additional function information in the first storage unit in response to an operation on the information processing apparatus; and
    a writing unit to write compatible additional function information in the first storage unit in case the additional function information compatible with the main unit of the program in the external apparatus exists, in response to the trigger detected by the detector.

5. The information processing apparatus according to claim 1, further comprising:
    a registration unit to register one or more additional functions added to the main unit of the program in the external apparatus; and
    a deleting unit to delete additional function information of an additional function unregistered in the registration unit from the second storage unit.

6. An information processing system including a printer driver to be executed by a computer, the information processing system comprising:
    a first device control program including a main unit to be executed on a second device control program including a main unit, which are installed from an external control program including of a main unit, wherein the main units in the first and second control programs are updated independently from the main unit in the external control program;
    a first storage unit to receive additional function information for adding a function to the second control program whose version corresponds to the version of the main unit in the second control program and store the additional function information in a first storage area;
    a second storage unit, different from the first storage unit, to store the additional function information in a second storage area if the second storage unit does not store the same version of the additional function information stored in the first storage unit; and
    a determining unit to identify additional model information whose version corresponds to the main unit in the first device control program among the additional model information stored in the first storage area and the second storage area.

7. The information processing system according to claim 6, further comprising a storage controller to store additional function information to be updated in the second storage unit in case additional function information in the first storage unit inherited from the first program in the external apparatus is updated.

8. The information processing system according to claim 6, further comprising a writing unit to store additional function information compatible with the main unit in the first device control program and store different versions of additional function information different from the additional function information compatible with the main unit in the first device control program in the second storage unit.

9. A non-transitory recording medium storing a program that, when executed by a computer, causes the computer to implement a method of controlling an information processing apparatus, the method comprising:

executing a device control program including a main unit on an external device, which is installed from an external control program including of a main unit, wherein the main unit in the device control program is updated independently from the main unit in the external control program;

receiving, via a first storage unit, additional function information for adding a function to the second control program whose version corresponds to the version of the main unit in the second control program and store the additional function information in a first storage area;

storing, via a second storage unit, the additional function information in a second storage area if the second storage unit does not store the same version of the additional function information stored in the first storage unit; and identifying additional model information whose version corresponds to the main unit in the device control program among the additional model information stored in the first storage area and the second storage area.

* * * * *